(12) United States Patent
Bates et al.

(10) Patent No.: US 9,295,346 B2
(45) Date of Patent: Mar. 29, 2016

(54) METHOD OF AND APPARATUS FOR DISPLAYING MERCHANDISE

(75) Inventors: Shawn P. Bates, Kansas City, MO (US); Darren B. Abbott, Harrisonville, MO (US); Rebecca Tegtmeyer, Raleigh, NC (US)

(73) Assignee: HALLMARK CARDS, INCORPORATED, Kansas City, MO (US)

( * ) Notice: Subject to any disclaimer, the term of this patent is extended or adjusted under 35 U.S.C. 154(b) by 2150 days.

(21) Appl. No.: 12/046,442

(22) Filed: Mar. 11, 2008

(65) Prior Publication Data

US 2009/0234724 A1    Sep. 17, 2009

(51) Int. Cl.
G09F 1/10   (2006.01)
A47F 7/14   (2006.01)
G06Q 30/02  (2012.01)

(52) U.S. Cl.
CPC ............ *A47F 7/145* (2013.01); *G06Q 30/0241* (2013.01); *G09F 1/10* (2013.01)

(58) Field of Classification Search
USPC ....................................... 40/606.08, 124, 657
See application file for complete search history.

(56) References Cited

U.S. PATENT DOCUMENTS

| 5,513,745 | A  | * | 5/1996  | Zoltan et al. ................... 206/741 |
| 6,467,637 | B2 | * | 10/2002 | Riga ............................ 211/94.01 |
| 6,612,052 | B2 | * | 9/2003  | Sawchuk .................... 40/124.01 |
| 7,401,430 | B2 | * | 7/2008  | Lindquist et al. ............... 40/657 |

FOREIGN PATENT DOCUMENTS

CA      2042713     7/1992

OTHER PUBLICATIONS

Business is booming with Hallmark/newsXpress Strategic Partnership, Feb. 18, 2008.*

* cited by examiner

*Primary Examiner* — Syed A Islam
(74) *Attorney, Agent, or Firm* — Shook, Hardy & Bacon L.L.P.

(57) ABSTRACT

A method of displaying merchandise creates a more user friendly display that facilitates quicker and easier shopping for a consumer. The display includes an information communication hierarchy that conveys various levels of information to consumers. The hierarchy includes branding information, product category information, product category information in an alternate orientation, indexing information and product specific information. The levels provide navigational directions to the consumer to direct them to a small subset of merchandise being displayed that would meet the consumer's needs.

11 Claims, 7 Drawing Sheets

METHOD OF AND APPARATUS FOR DISPLAYING MERCHANDISE

CROSS-REFERENCE TO RELATED APPLICATIONS

Not applicable.

STATEMENT REGARDING FEDERALLY SPONSORED RESEARCH OR DEVELOPMENT

Not applicable.

BRIEF SUMMARY OF THE INVENTION

The present invention relates to a method of displaying merchandise and an apparatus constructed in accordance therewith. More particularly, this invention relates to a method of displaying greeting cards for retail sale. The method is designed to readily convey information to greeting card shopping consumers to more quickly direct the consumer to the appropriate card, thereby reducing shopping time and increasing the likelihood that the consumer finds a greeting card for the specific occasion for which they were shopping.

Consumers generally shop for greeting cards for specific events or occasions. To assist consumers in locating appropriate cards, greeting card displays typically convey various information to consumers regarding the cards on display. However, the arrangement of this information greatly affects the ability of a consumer to locate a specific card and the time associated therewith. As the ability to locate a specific card increases and the time required to find the card decreases, customer satisfaction improves, thereby generating customer satisfaction with a product and consumer loyalty in connection therewith.

To assist with the objects noted above, a communication hierarchy has been developed to convey the necessary information to the prospective purchasers in a manner which increases wayfinding and decreases the average amount of time associated therewith. The communication hierarchy includes branding information, product category information, product category information in an alternate orientation, indexing information and product specific information.

The first level of the communication hierarchy relates to branding of the product on display. The brand of the product being displayed is an important piece of the information disclosed to a perspective consumer. The brand initially tells the consumer that they are in the correct location and that the products they are looking at are manufactured by or associated with a known or desired brand. The brand information also reinforces consumer loyalty at the end of the shopping experience to facilitate subsequent purchases after a successful and positive shopping experience. The brand information can include not only the name of the company but may also include an indication as to the product line of that specific company that is being displayed (e.g., Expressions by Hallmark).

The next or second level of information to be displayed in the communication hierarchy is the product category. This information quickly directs the consumer to the location of greeting cards for the specific event or occasion for which the consumer is shopping. Examples of product categories would include everyday cards (e.g., birthday, wedding, get well, sympathy, etc.) seasons (e.g., Christmas, Valentines, etc.), new product information, sub-brands, and marketing messages. Product category information provides the consumer with entry level navigation to quickly put the consumer in front of the greeting cards related to the specific event for which they are shopping.

The third level of communication reinforces the product category information of the second level by presenting similar information in an alternate location and orientation. In most retail stores, greeting card displays are usually provided in certain aisles of the stores. As such, consumers generally approach a greeting card display from the side. It is not until the consumer is directly in front of the display, generally, that they can determine which cards are located in which areas of the display. To assist with entry level navigation, signs may be provided which stick out from the fixtures and display information in a direction generally perpendicular to the fronts of the displays so that this information is readily viewable from a distance down the aisle such that a user may walk directly to a group of cards for a particular event.

The fourth level of communication can be described under the general category of indexing information. This information includes recipient information (e.g., husband, wife, niece, uncle, grandparent, etc.) and quickly directs the purchaser to a sub-set of cards that generally fall within the user's needs. For example, Valentine cards for wife. Once the user has located the region or area where this sub-set of cards is located, the user may then further narrow the number of cards to be viewed by using the information in the fifth level of communication, namely, information specific to a particular card.

This fifth level of information is generally displayed on a sign associated with a specific greeting card. These informational signs or cards are also referred to as pocket identifier cards (PIDs). PIDs are manufactured to be slightly taller than the card with which they are associated such that a portion of the PID is visible above the cards and their envelopes. The information in the fifth level is placed on the portion that is visible above the cards and their envelopes. This information includes card specific information which includes recipient information, giver information, and sub-brand information, and calls out unique consumer attributes, such as "Cards with Sound" or special pricing messages (e.g., 99¢). Attribute information may be spelled out editorially or the use of specific icons may be used for increased ease and speed of wayfinding.

Further objects, features and advantages of the present invention over the prior art will become apparent from the detailed description of the drawings which follows, when considered with the attached figures.

BRIEF DESCRIPTION OF THE SEVERAL VIEWS OF THE DRAWINGS

The features of the invention noted above are explained in more detail with reference to the embodiments illustrated in the attached drawing figures, in which like reference numerals denote like elements, in which FIGS. 1-6 illustrate several possible embodiments of the present invention, and in which:

FIG. 1 is a front side-elevational view of a portion of a merchandise display fixture set up in accordance with an embodiment of the present invention;

FIG. 2 is an enlarged fragmentary view of the fixture of FIG. 1 taken in the area of 2-2;

FIG. 3 is an enlarged fragmentary view of the fixture of FIG. 1 taken in the area of 3-3;

FIG. 4 is a fragmentary perspective view of the right end of the fixture of FIG. 1;

FIG. 5 is a front side-elevational view of a portion of a merchandise display fixture set up in accordance with an alternate embodiment of the present invention;

FIG. 6 is a front side-elevation view of a plurality of PIDs with exemplary, fifth level communication hierarchy, card specific information thereon.

DETAILED DESCRIPTION OF THE INVENTION

Figure 1:
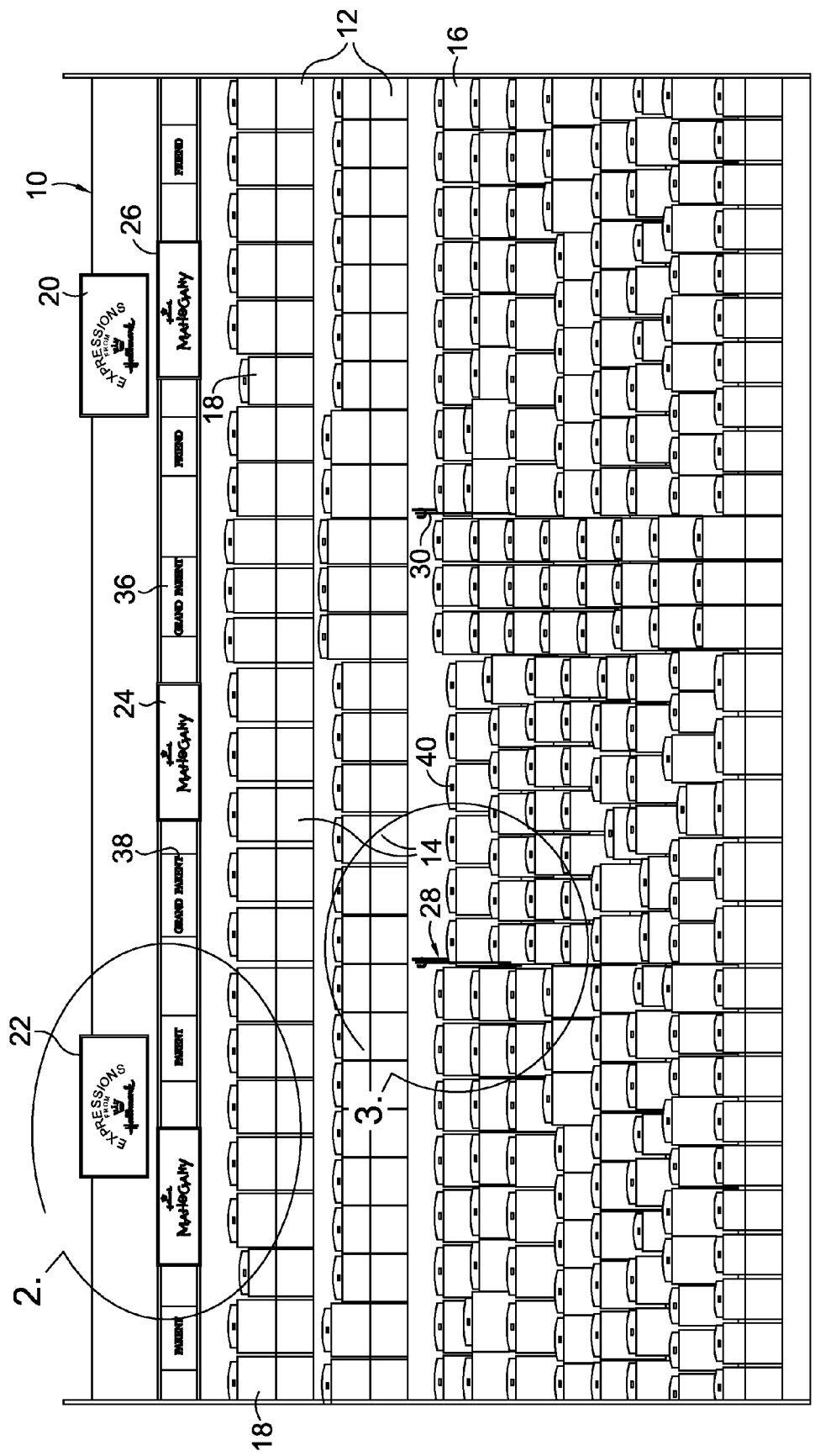

Referring now to the drawings in more detail and initially to FIG. 1, numeral 10 generally designates a merchandise display fixture arranged in accordance with a method of the present invention. The fixture 10 includes a plurality of shelves 12. Some of the shelves 12 may provide individual rows 14 for displaying cards, as illustrated in FIG. 1 where two rows 14 of shelves 12 are provided near the top of the fixture 10 in generally the same vertical plane. The fixture 10 may also provide for a plurality of shelves 12 where the rows 14 are partially covered by the next proceeding row 14 in a manner known in the industry and as is depicted in the lower portion of FIG. 1. In this arrangement, the shelves 12 are generally provided in a stair-stepped arrangement such that the back of each next lower shelf 12 aligns with the front of the shelf 12 immediately above it. This allows for the display of just an upper portion 16 of a card 18. Consequently, each shelf 12 is moved slightly forward toward the aisle down which a consumer would walk when viewing the cards 18 in a retail environment. It should be noted that the number and arrangement of the rows may be changed from the illustrated embodiment and still be within the scope of the present invention.

The information and communication hierarchy of the present invention preferably includes five levels of communications. It should be understood that additional levels of communication could be used as well as certain levels of communications be omitted and benefits still be achieved therefrom. However, a five level system will be discussed initially in connection with the embodiment depicted in FIGS. 1-4. It should also be understood that the levels could be provided in a different sequence and still be within the scope of the present invention.

Figure 2:
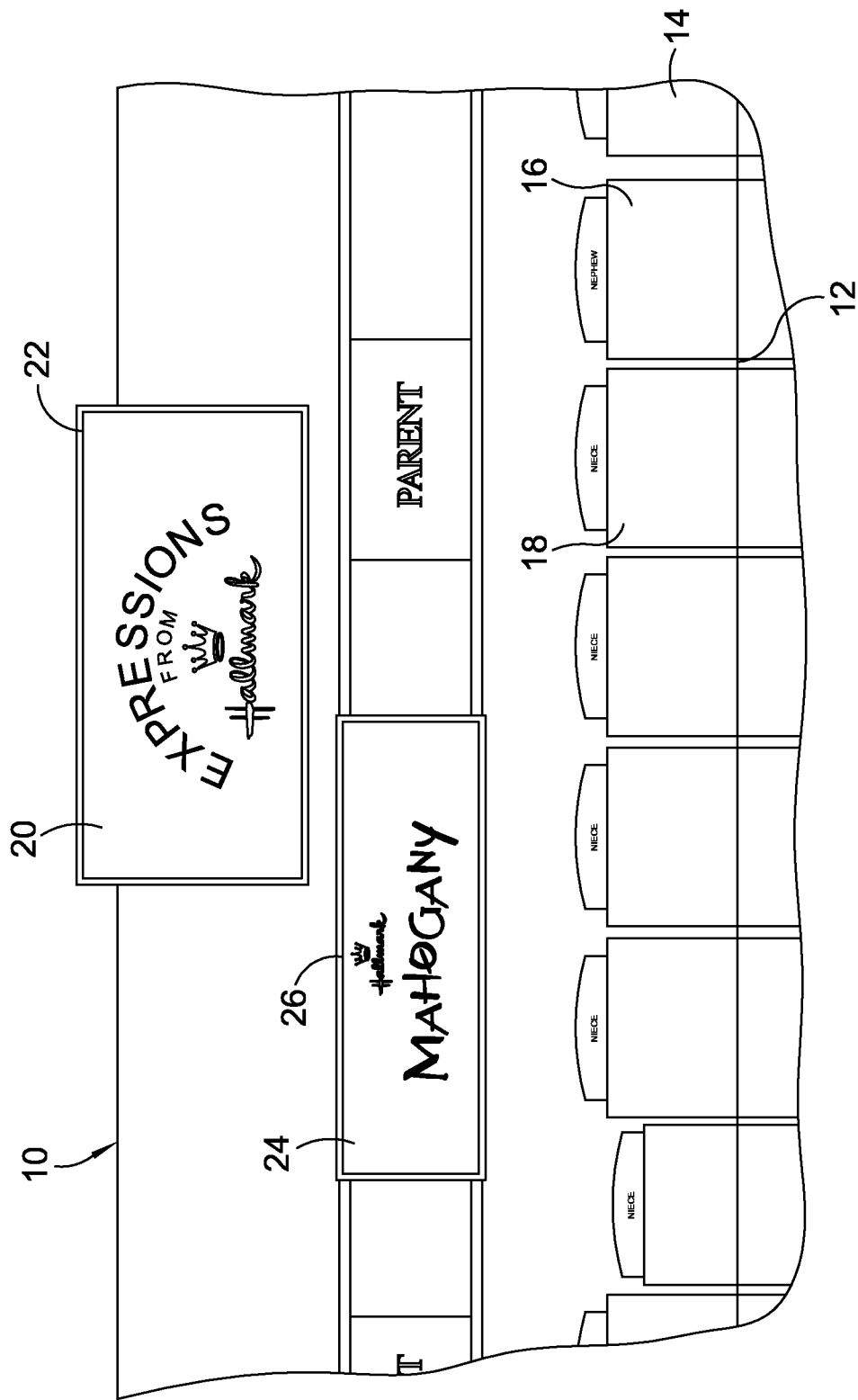
Figure 3:
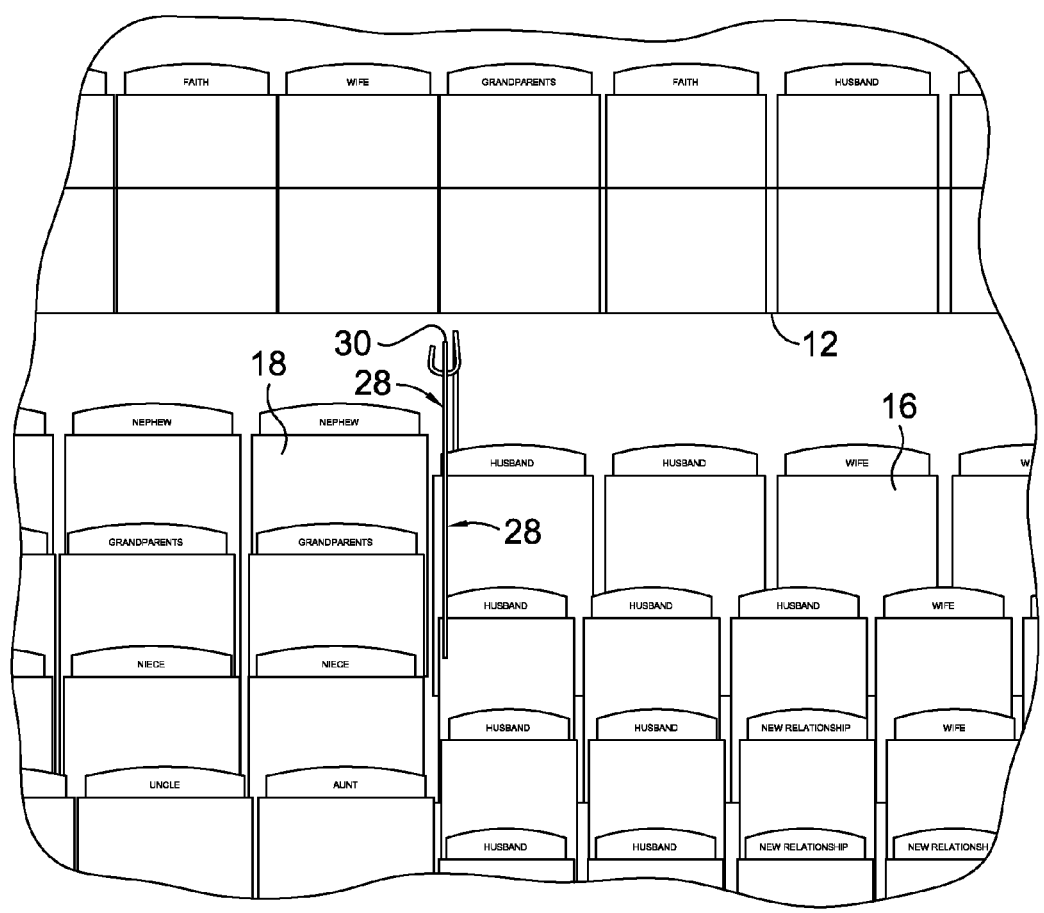

In accordance with an embodiment of the method of the present invention, the fixture 10 includes a first information display location 20 for displaying brand information. In the illustrated embodiment, the first information display location 20 takes the form of a sign 22 upon which brand information is placed. The brand information provides brand reinforcement and communicates to the consumer the highest level brand of the product being displayed. For example, the first information display location 20 may display the Hallmark brand or it may display the name of a product line by a particular brand, such as, Expressions From Hallmark, as depicted in FIG. 2. The first information display location 20 is provided, preferably, above all other information display locations, as well as above all of the merchandise/greeting cards 18. The sign 22 upon which the first information display location 20 is found may be coupled with the fixture 10 or may be suspended above the fixture 10.

A second information display location 24 is provided on the fixture 10 for displaying product category information. The second information display location 24 may take the shape of a second sign 26. The product category information found in the second information display location 24 provides entry level navigation to the product being displayed and includes, for example, highest level information of the product displayed in proximity to the second information display location 24. Such information, for example in connection with greeting cards, would include the event to which the cards relate (e.g., birthday, anniversary, care and concern, sympathy, get well, Christmas, Valentine's, etc.), sub-brand information and various marketing messages. In the embodiment illustrated in FIG. 2, the second information display location 24 identifies that the cards 18 contained in that particular area are of the Mahogany line or sub-brand. Preferably, the second information display location 24 is below the first information display location 20 and above the uppermost row 14 of cards 18 on the fixture 10.

Figure 4:
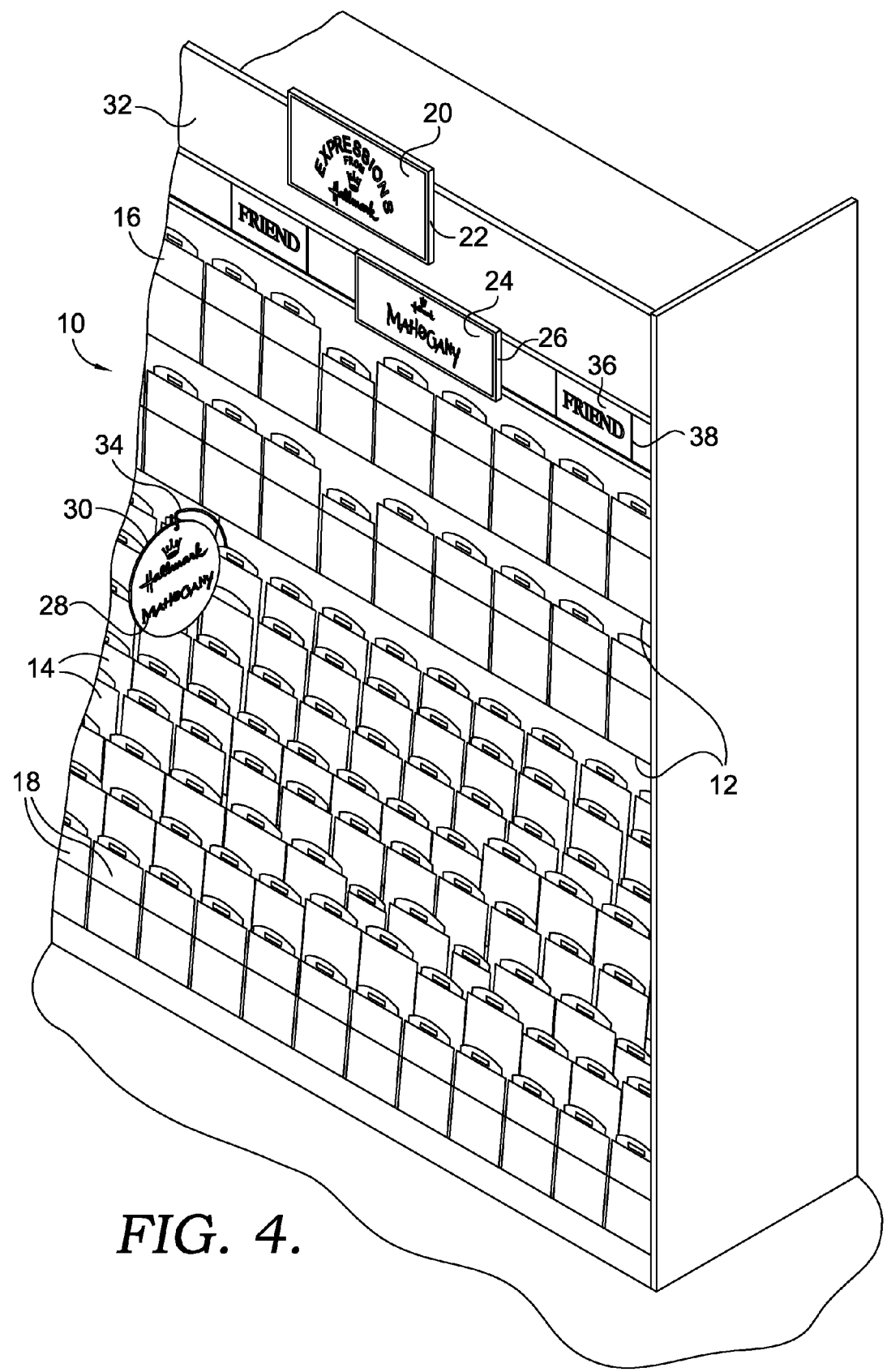

A third information display location 28 provides information to a consumer in a different orientation from the orientation of the second information display location 24. As best illustrated in FIG. 4, the third information display location 28 takes the form of a third sign 30. Unlike the second information display location 24 which is oriented to direct the information directly away from a front 32 of the fixture 10, such that it is best viewed by a consumer when standing directly in front of and facing the cards 18, the third sign 30, and in turn the third information display location 28, is provided in an orientation to direct the information perpendicular to the front 32 of the fixture 10, such that the information on the third information display location 28 is best viewable by a consumer when they are walking down the aisle in a direction generally parallel to the front 32 of the fixture 10.

Figure 7:
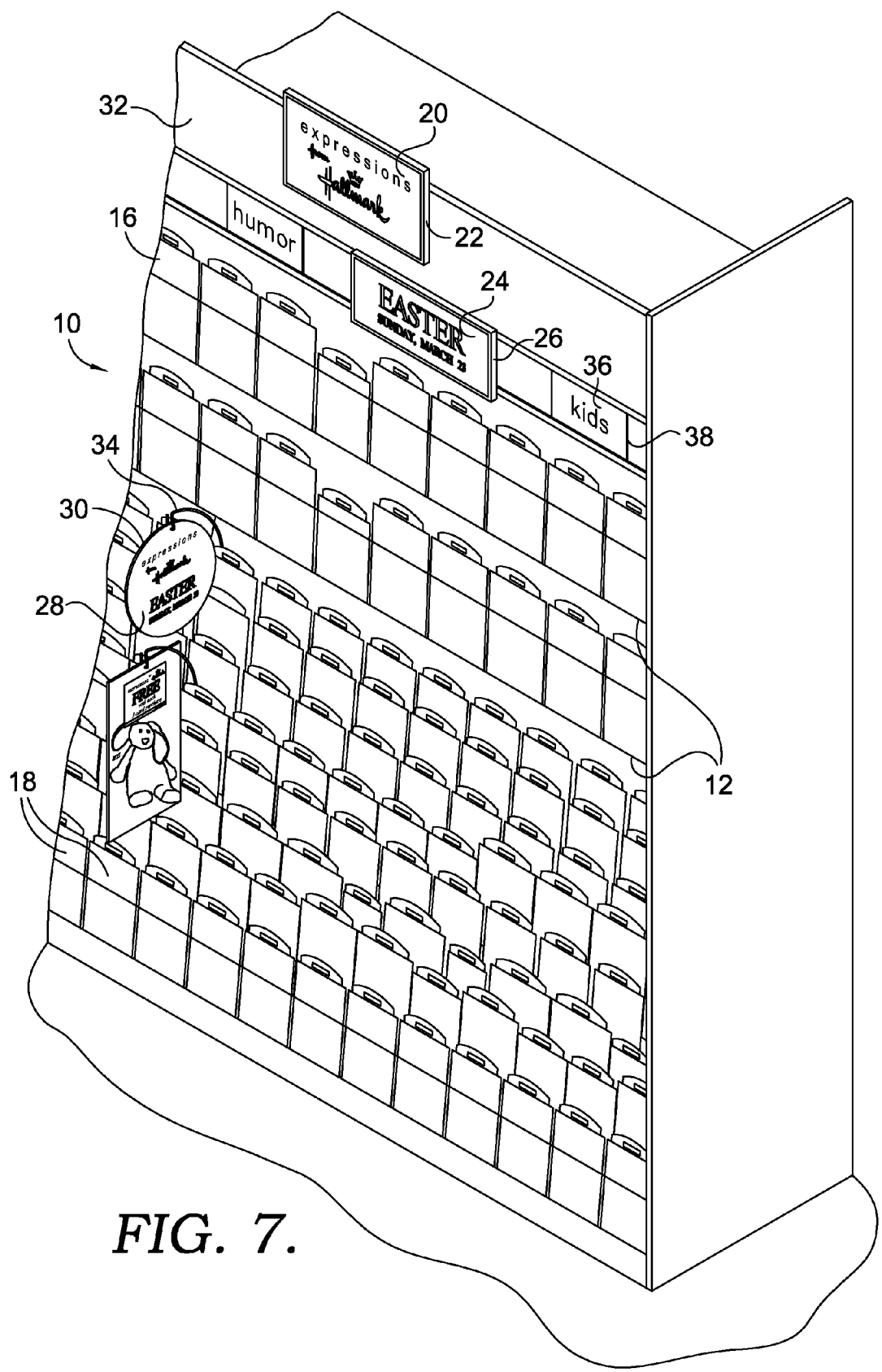
FIG. 7 is a fragmentary perspective view of a right end portion of a merchandise display fixture set up in accordance with an alternate embodiment of the present invention.

Preferably, the third information display location 28 includes information similar to that provided in the category level or second level communication of the communication hierarchy. Additionally, highest level brand information may be provided on the third information display location. In addition to category information, the third information display location 28 may also provide action information to induce a consumer to purchase a card (e.g., "use music") as well as offer information (e.g., "buy three get one free" or "100 bonus points with every card"). To improve wayfinding, action information can be relegated to an alternate embodiment of the third information display location 28. As illustrated in FIG. 7, this may take the form of the square third sign 30, which is of a different shape and is hung at a different height from other (and in the illustrated embodiment round) third signs 30. In this regard, the square third sign 30 does not detract from the wayfinding properties of the third information display location 28. In other words, while this additional information can be provided on the third information display location 28, the primary purpose of the third information display location 28 in most instances is to provide a consumer approaching a card display fixture 10 with quick navigation to the location in the fixture 10 where they can find cards 18 related to the specific occasion for which they are card shopping. Examples of such information would include wedding, sympathy, birthday for her, Christmas, Mother's Day, etc. When used in this manner, the third information display location 28, and in turn the third sign 30, allows a consumer to walk directly to the location in the fixture 10 that has the cards 18 most appropriate for the specific occasion for which they are purchasing a card. Once at that location, the user may turn and face the fixture 10 to be faced with more specific information related to the cards adjacent the third information display location 28, to further assist the consumer in picking out a card 18.

In one embodiment, the second sign 26 and the third sign 30 are preferably provided with a background color which corresponds to or is tied to the information displayed in the two signs 26, 30. For example, if the section of cards 18 is for Valentine's Day, both the second sign 26 and the third sign 30 might have a red background color and the text "Valentine's Day" would be printed thereon. The use of the same text and background colors in the second and third signs 26, 30 quickly reassures the consumer that they are in the correct location and reinforces the type of cards they will find in the section in front of which they are now standing.

In the embodiment illustrated in FIGS. 1-4, the third sign 30 is round in nature. While the sign 30 could be of any shape, a round sign has been found beneficial in that its shape contrasts with the rectangular shape of the cards 18 and their envelopes, as well as with the linear appearance of the rows 14 of shelves 12. Similarly, an arrangement where the sign 30 is hung from a sign hook 34 provides an attractive and eye catching display which readily directs the consumer's attention to the third sign 30, again helping with initial navigation. A proximal end (hidden behind a card 18) of the sign hook 34 is coupled with the fixture 10.

The fixture 10 also includes a fourth information display location 36 which provides a location for communication of information in a fourth level of the communication hierarchy. The fourth information display location 36 takes the form of a fourth sign 38. In the embodiment illustrated in FIGS. 1-4, the fourth information display location 36 is beside the second information display 24. In alternate embodiments, such as the embodiment illustrated in FIG. 5, the fourth information display location 36 is located below the second information display location 24.

The fourth information display location 36 includes information generally contained under the category of indexing information. This information generally includes information on the recipient of the card or the occasion for which the card pertains. Examples of information typically found in the fourth information display location 36 include familial relationship (e.g., mother, father, step mom, sister, aunt, etc.) or other recipient information. Indexing information can also include product news or benefit information (e.g., cards for unique needs).

The fixture 10 also includes a fifth level of communication in a communication/product information message hierarchy in the form of a fifth information display location 40. The fifth information display location 40 takes the form of a fifth sign 42. In the illustrated embodiment, the fifth sign 42 is an item generally referred to in the industry as a product identifier ("PID") card. A PID is generally constructed from paper card stock and sized to have a width dimension less than that of the card with which it is associated as well as a height dimension greater than that of the card with which it is associated. PIDs are generally manufactured to be specific to the particular card with which they are associated. In this manner, a uniform amount of the PID or fifth sign 42 is visible directly above the card 18 with which it is associated when the PID 42 is placed behind its associated card 18 on a shelf 12 of the fixture 10. As the majority of cards 18 (and especially their corresponding envelopes) are rectangular, a non-straight upper edge of the PID or fifth sign 42 is has been found beneficial to help make the fifth information display location 40 stand apart from the cards 18 and their envelopes, thereby improving wayfinding. In the illustrated embodiment, the non-straight upper edge of the PIDs 42 are arched. Other non-straight shapes can be used, in addition to straight edges.

Figure 6:
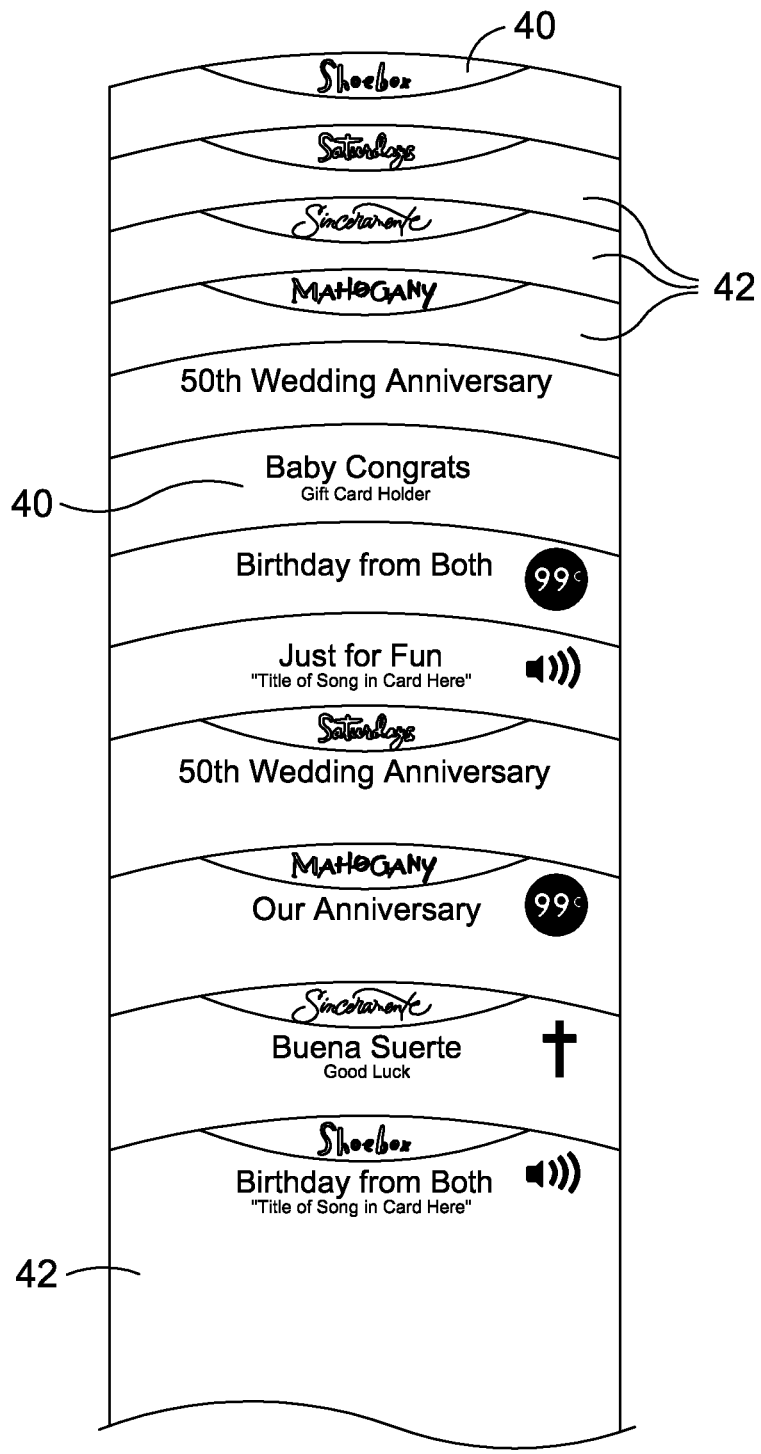

The information provided in the fifth level of the communication hierarchy of the present invention can be categorized as pocket identifier or product identifier information. This information provides a consumer with product specific information. Such information may include recipient information (e.g., niece, nephew, uncle, etc.) or giver information (e.g., From Us Both With Love). Other information which can be found on the fifth information display location 40 includes commentary on the message or text of the card 18 (e.g., humor, just for fun, etc.) or that no message is contained (e.g., blank inside). The fifth information display location 40 may also contain sub-brand information and icons to readily convey features of the card 18. Such icons may include religious symbols, a speaker to indicate a sound card, a microphone to indicate a recordable card, and a pricing icon. FIG. 6 illustrates a plurality of PIDs/fifth signs 42 with fifth information display locations thereon containing exemplary product specific information thereon.

By providing the five levels of communication hierarchy disclosed above, the method discussed herein of the present invention, as well as a fixture 10 laid out in accordance with the method, provide a consumer with identification information which has been found to significantly reduce the time required for a consumer to locate a specific card which would meet the consumer's needs over prior art displays. To illustrate benefits of such navigation, an example is discussed below.

In this example, a consumer at a retail store heads to the card aisle to locate a birthday card for their niece. As the consumer turns down the aisle, they can readily see a plurality of third signs 30 which stick out into the aisle. If the consumer has shopped in a card aisle incorporating the present invention before, the consumer may be able to associate a color (e.g., a purple background) of a third sign 30 with the event (birthday cards) before the user could read the text found on the third information display location 28. If the consumer is not familiar with the color scheme, as the user heads down the aisle, they quickly find a third sign 30 that displays information indicating that birthday cards are found adjacent a particular third sign 30. This allows the user to quickly walk past non-birthday cards without having to slow down to read various items to determine the types of cards in those sections or the events with which they are associated.

Once the user arrives next to the third sign 30 which indicates that birthday cards are found in that area, the consumer may turn to face the fixture 10. Upon facing the fixture 10, the user is quickly provided with a reassurance that they are in the correct location by the message provided in the second information display location 24. In this example, that information would also indicate a phrase "birthday". And, preferably, the background color of the second sign 26 would match the background color of the third sign 30, again to reinforce that the user has stopped at the proper location. The consumer is also quickly informed that all of the cards in that location are of a particular brand (e.g., Hallmark) by way of the first information display location 20 located above the cards.

By looking now at a fourth information display location 36 in that area, the consumer can quickly determine the smaller area that contains birthday cards for nieces. Upon determining the location of the small area that contains cards 18 for a nieces' birthday, then, and only then, does the consumer need to look at information specific to individual cards. This information can quickly narrow the consumer to a small handful of cards for nieces' birthdays that would fit the consumer's desires or personality. For example, the user may be looking for a humorous card, at which point the consumer may scan the PIDs or fifth signs 42 directly behind the individual cards 18 for a fifth information display location 40 that contains the word "humor". At this point, the consumer now only needs to pick up and look at the small handful of cards that are humorous birthday cards for a niece. As can be seen, the method of the present invention and a fixture 10 constructed or arranged in accordance therewith, can readily assist a consumer in finding a desired greeting card in a minimal amount of time.

Figure 5:
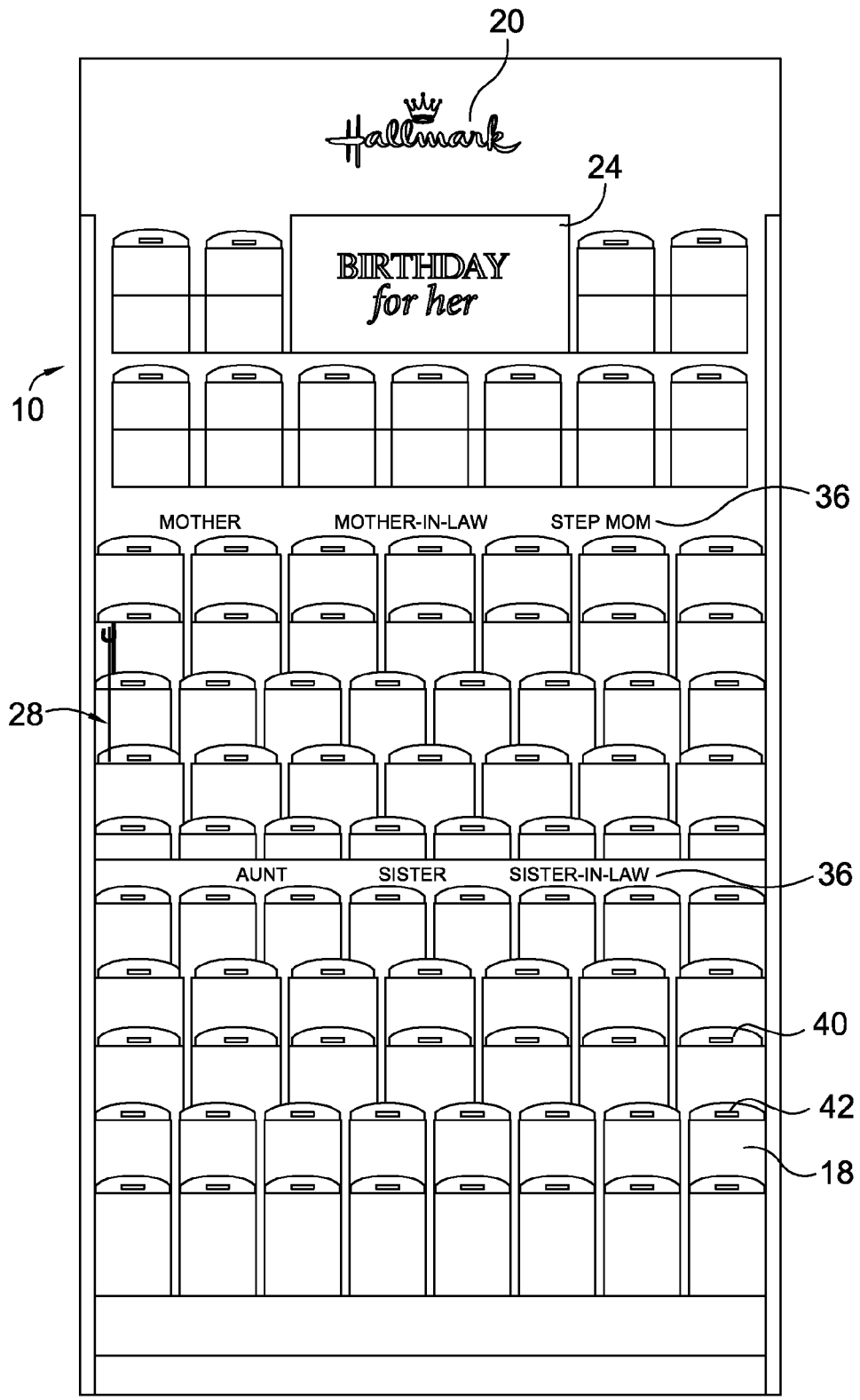

Many variations can be made to the illustrated embodiment of the present invention without departing from the scope of the present invention. Such modifications are within the scope of the present invention. For example, the vertical relationship between the different display locations can be rearranged. FIG. 5 illustrates an alternate arrangement of the different display locations. Other modifications would be within the scope of the present invention.

From the foregoing it will be seen that this invention is one well adapted to attain all ends and objects hereinabove set forth together with the other advantages which are obvious and which are inherent to the method and apparatus. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A method of displaying information about greeting cards positioned for sale in a generally vertical display fixture having a plurality of shelves, wherein the method conveys information about the greeting cards being displayed to assist a potential purchaser in finding a greeting card for a particular occasion, the method comprising:
    displaying information in a first location adjacent a top edge of the display fixture which identifies the brand of the greeting cards being displayed there below;
    displaying information in a second location which identifies a category of the greeting cards being displayed adjacent the second location, wherein the second location is below the first location;
    displaying information in a third location which identifies a category of the greeting cards being displayed adjacent the third location, wherein the information displayed at the third location corresponds with the information displayed at the second location, wherein the third location is spaced outwardly away from the greeting cards being displayed adjacent the third location, and wherein the third location is spaced outwardly away from the second location;
    displaying information in a fourth location which identifies a sub-category of the greeting cards being displayed adjacent the fourth location, wherein the fourth location is below the first location; and
    displaying information in a fifth location, wherein the fifth location is immediately adjacent a specific greeting card being displayed, wherein the information displayed at the fifth location includes information specific to the specific greeting card being displayed, and wherein the information further delineates the information provided in the fourth location.

2. The method of claim 1, wherein the third location is generally perpendicular to the second location.

3. The method of claim 2, wherein the first, second, fourth and fifth locations are generally parallel with each other.

4. The method of claim 1, wherein the information displayed at the second location is displayed with a background color, wherein the information displayed at the third location is displayed with a background color, and wherein the background colors of the second and third locations are identical.

5. The method of claim 1, wherein the third location is on a hanging sign, wherein the hanging sign is spaced outwardly from at least one of the shelves, wherein the hanging sign is suspended from a hook, and wherein the hook is coupled with the display fixture.

6. A fixture for displaying greeting cards for sale, the fixture comprising:
    a plurality of shelves provided in a generally vertical arrangement;
    a first information display location adjacent a top edge of the fixture, wherein the first information display location includes information which identifies the brand of the greeting cards being displayed in the shelves below the first information display location;
    a second information display location below the first information display location,
    wherein the second information display location includes information which identifies a category of the greeting cards being displayed in the shelves adjacent the second location;
    a third information display location spaced outwardly away from the shelves, wherein the third information display location includes information which identifies a category of the greeting cards being displayed in the shelves adjacent the third location, and wherein the information displayed at the third location corresponds with the information displayed at the second location;
    a fourth information display location located among the shelves, wherein the forth information display location includes information which identifies a sub-category of the greeting cards being displayed in the shelves adjacent the fourth location,
    wherein the fourth location is below the first location; and
    a fifth information display location located adjacent a shelf and immediately adjacent a specific greeting card being displayed thereon, wherein the information displayed at the fifth location includes information specific to the specific greeting card being displayed, and wherein the information further delineates the information provided in the fourth information display location.

7. The fixture of claim 6, wherein the third information display location is generally perpendicular to the second information display location.

8. The fixture of claim 7, wherein the fixture further includes a sign holder removably coupled a shelf, wherein the sign holder supports a sign in a location spaced apart from a shelf, and wherein the third information display location is located on the sign.

9. The fixture of claim 8, wherein the sign is suspended from the sign holder and wherein the sigh is round.

10. The fixture of claim 6, wherein the fixture further includes a pocket identifier card removably positioned on a shelf and wherein the fifth information display location is located on the pocket identifier card.

11. The fixture of claim 10, wherein the pocket identifier card has an arched upper edge, whereby the arched upper edge presents a visually different impression from the typically rectangular appearance of greeting card envelopes.

* * * * *